US012574715B1

(12) United States Patent
Nayak et al.

(10) Patent No.: US 12,574,715 B1
(45) Date of Patent: Mar. 10, 2026

(54) SYSTEMS AND METHODS OF AUGMENTED CALLING

(71) Applicant: Meta Platforms Technologies, LLC, Menlo Park, CA (US)

(72) Inventors: Shivank Nayak, Milpitas, CA (US); Mahesh Devdatta Telang, San Ramon, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 431 days.

(21) Appl. No.: 18/078,247

(22) Filed: Dec. 9, 2022

(51) Int. Cl.
*H04W 4/90* (2018.01)
*H04W 4/38* (2018.01)

(52) U.S. Cl.
CPC .............. *H04W 4/90* (2018.02); *H04W 4/38* (2018.02)

(58) Field of Classification Search
CPC .................................. H04W 4/90; H04W 4/38
See application file for complete search history.

(56) References Cited

U.S. PATENT DOCUMENTS

| | | | |
|---|---|---|---|
| 2009/0160673 A1* | 6/2009 | Cirker .............. | G08B 13/19686 |
| | | | 340/12.22 |
| 2013/0029629 A1* | 1/2013 | Lindholm ....... | H04W 36/00226 |
| | | | 455/404.1 |
| 2019/0239136 A1* | 8/2019 | Faccin .................. | H04W 36/13 |

* cited by examiner

*Primary Examiner* — Marcos L Torres
(74) *Attorney, Agent, or Firm* — Foley & Lardner LLP

(57) ABSTRACT

Disclosed herein are a wireless communication device and method configured to grant a second communication session between the wireless communication device and the server to carry data from a sensor. The sensor can be accessible by the wireless communication device and not providing data for the first communication session. A processor of the wireless communication device can provide, to the server, access to the data from the sensor via the second communication session.

20 Claims, 6 Drawing Sheets

400

100

200

400

500

600

SYSTEMS AND METHODS OF AUGMENTED CALLING

FIELD OF DISCLOSURE

The present disclosure is generally related to wireless communication, including but not limited to network communication control.

BACKGROUND

Wireless communication devices, such as mobile devices, can be used by users to communicate with different network devices or services. Wireless communication between network devices can be used in a variety of situations. Wireless communication devices can exchange data with other network devices using wireless links communicating via a variety of network protocols.

SUMMARY

In an emergency situation, a user can contact (e.g., via a 911 call) an emergency service provider, such as a Public Safety Answering Point (PSAP), to seek help. Upon receiving the call, the emergency service provider can dispatch emergency services to the user, such as an ambulance, firefighters or the police. However, sometimes it is difficult to accurately assess the type of emergency, which can result in the emergency service provider dispatching inadequate first responder services to the user. For example, when a user is incapable of providing accurate information about the emergency event, the emergency service provider can underestimate the severity of the situation and fail to timely provide additional or specialized emergency services, such as an airlift or specialized personnel or vehicles. As additional or specialized services or tools are normally not dispatched to the emergency site until after the first responders have already arrived and inspected in the site, the arrival of such services and tools can take more time than is sometimes available. Since the user may be in a life threatening and time sensitive situation, waiting for the adequate help to arrive can be costly. The present disclosure presents a solution by which a server of the emergency service provider can establish, via a user device, a callback session in order to access video or audio live feed, photographic data, or any other sensor data from the user device, or access devices paired with the user device, providing the server with additional information to improve the ability of the emergency service provider to more accurately evaluate the situation and more timely dispatch the adequate emergency services to the emergency site.

In some aspects, the present disclosure relates to a method. The method can include a wireless communication device initiating a first communication session. The first communication session can correspond to an emergency event. The method can include the wireless communication granting a second communication session between the wireless communication device and the server to carry data from a sensor. The sensor can be accessible by the wireless communication device and not providing data for the first communication session. The method can include the wireless communication device providing, to the server, access to the data from the sensor via the second communication session.

The method can include the wireless communication device initiating the first communication session via a connection between the wireless communication device and the server. The method can include providing, by the wireless communication device to the server, the access to the data via the connection. The method can include identifying, by the wireless communication device, a second wireless communication device comprising/having a second sensor. The second sensor can be accessible to the wireless communication device. The method can include granting, by the wireless communication device, a third communication session between the wireless communication device and the server to carry second data from the second sensor. The method can include providing, by the wireless communication device to the server, access to the second data from the second sensor via the third communication session.

The method can include the wireless communication device initiating the first communication session via a first connection between the wireless communication device and the server. The method can include granting, by the wireless communication device, a second connection between the wireless communication device and the server. The second connection can be initiated by the server in response to the first connection being unavailable. The method can include providing, by the wireless communication device to the server, the access to the data via the second communication session over the second connection.

The sensor can include at least one of: a camera, a microphone, a temperature sensor, a light sensor, a position sensor, a motion sensor, or a sensor measuring a vital sign of a user. The sensor can reside with a second wireless communication device. The second wireless communication device can be in communication with the wireless communication device. The granting of the second communication session can be is in response to user input (e.g., user action granting permission) at the wireless communication device. The granting of the second communication session can be in response to a setting configured (e.g., authorized/accepted by the user) prior to the emergency event. The wireless communication device can receive a connection request for the second communication session in response to a trigger related to the first communication session.

In some aspects the present disclosure relates to a wireless communication device. The wireless communication device can include at least one processor configured to initiate a first communication session with a server corresponding to an emergency event. The processor can be configured to grant a second communication session between the wireless communication device and the server to carry data from a sensor. The sensor can be accessible by the wireless communication device and not providing data for the first communication session. The processor can provide, to the server, access to the data from the sensor via the second communication session.

The wireless communication device can include the processor that is configured to initiate the first communication session via a connection between the wireless communication device and the server. The wireless communication device can provide, to the server, the access to the data via the connection. The wireless communication device can include the processor that is configured to identify a second wireless communication device comprising a second sensor. The second sensor can be accessible to the wireless communication device. The processor can be configured to grant a third communication session between the wireless communication device and the server to carry second data from the second sensor. The processor can be configured to provide, to the server, access to the second data from the second sensor via the third communication session.

The wireless communication device can include the processor configured to initiate the first communication session via a first connection between the wireless communication device and the server. The processor can be configured to grant a second connection between the wireless communication device and the server. The second connection can be initiated by the server in response to the first connection being unavailable. The processor can be configured to provide, to the server, the access to the data via the second communication session over the second connection.

The sensor can include at least one of: a camera, a microphone, a temperature sensor, a light sensor, a position sensor, a motion sensor or a sensor measuring a vital sign of a user. The sensor can reside with a second wireless communication device. The second wireless communication device can be in communication with the wireless communication device. The granting of the second communication session can be in response to a user input at the wireless communication device. The granting of the second communication session can be in response to a setting configured prior to the emergency event. The processor can be configured to receive a connection request for the second communication session in response to a trigger related to the first communication session.

In some aspects, the present solution relates to a non-transitory computer readable medium storing program instructions. The instructions can cause at least one processor of a wireless communication device to initiate a first communication session with a server corresponding to an emergency event. The instructions can cause the processor to grant a second communication session between the wireless communication device and the server to carry data from a sensor. The sensor can be accessible by the wireless communication device and not provide data for the first communication session. The second communication session can be granted in response to the authorization provided by the wireless communication device. The instructions can cause the processor to provide, to the server, access to the data from the sensor via the second communication session. The sensor can reside with a second wireless communication device. The second wireless communication device can be in communication with the wireless communication device.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Figure 1:
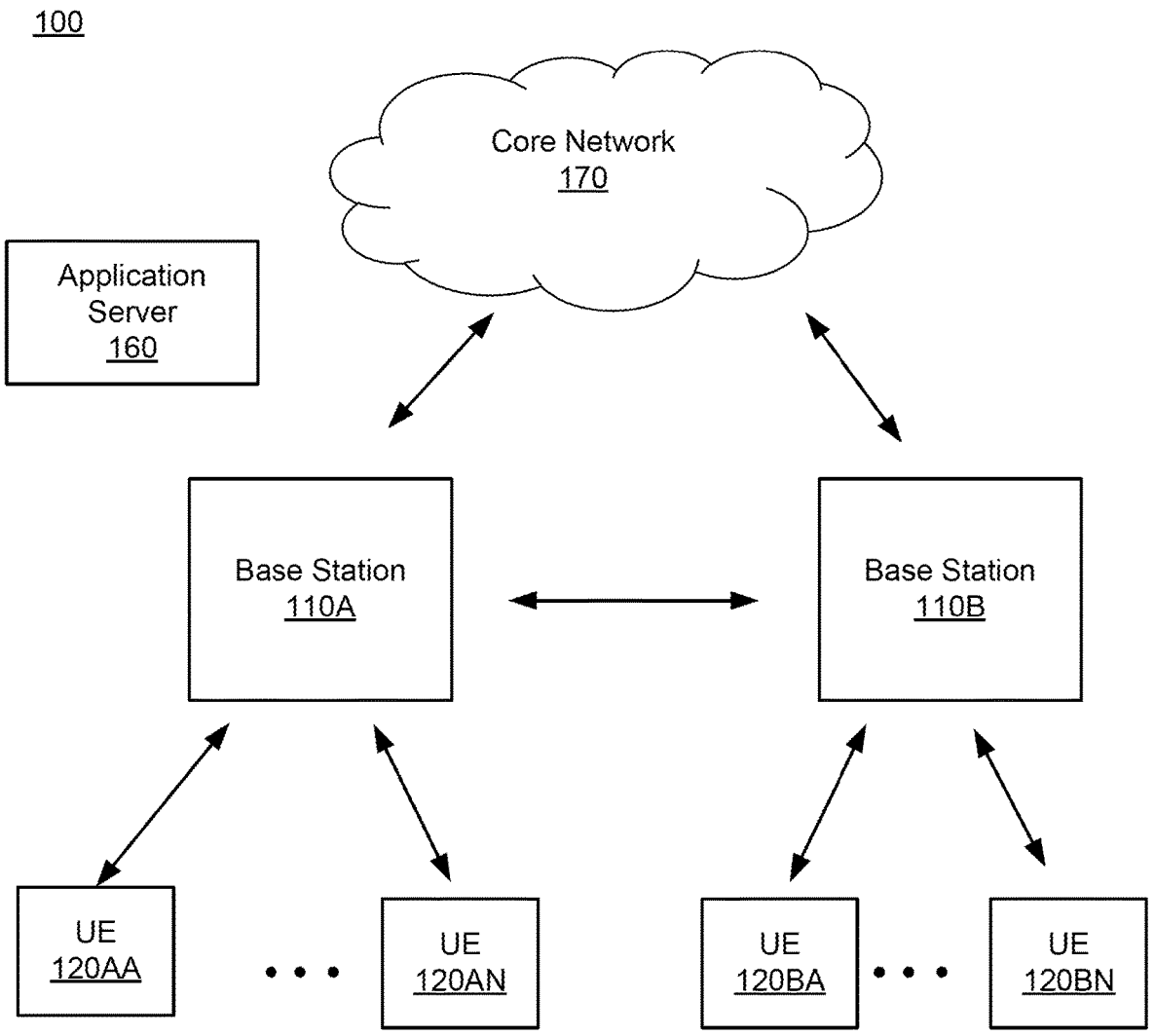
FIG. 1 is a diagram of an example wireless communication system, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

The present disclosure relates to systems and methods for establishing, by a remote server of an emergency service provider, callback sessions, via a user device and any devices paired with the user device, to allow the server to access sensor data from the user device and the paired devices. Using the sensor data from the user's and paired devices, the server can allow the call center to more accurately estimate the severity of the user's emergency situation and can more adequately and timely provide specific first responder services to the emergency site. In emergency situations, users may call an emergency service or a call center (e.g., by dialing 911 to a PSAP call center). Depending on the user's ability and knowledge, providing accurate and prompt emergency service to a user can be challenging since sometimes it is difficult for a user to accurately assess the severity of the emergency situation. For example, in some emergencies, users may be injured or incapable of providing meaningful or accurate information to help identify the type of services useful at the emergency site. While sometimes emergency service providers can provide adequate support by dispatching an ambulance or the firefighters, some emergencies can warrant more a specialized service, such as an airlift, specialized tools or specialized personnel. Because such specialized services or personnel are normally provided only upon on-site inspection by the dispatched first responders, in some life-threatening and time sensitive situations such services may arrive too late.

The present solution address these issues by establishing, via a server, a callback session with a user device (and any devices paired with the user device) to allow the server to access sensor data of the user's and any paired devices at the emergency location. The sensor data can include, for example, a video or audio live stream, sensor measurements of temperature, pressure, velocity, health data of a user, such as a user's heartbeat rate or oxygen blood levels from a smartwatch that can be paired with the user's smartphone or sensor information from the user's vehicle. The server can establish individual/dedicated/combined/supplemental sessions, via the user's device, with various devices and for various sensors, such as for example sensors of the user's vehicle or any other devices with which the user's vehicle is paired. Using the received sensor data the server, or the call center personnel, can gather relevant information from the user's emergency site and can more accurately estimate the severity and conditions at the site. The server or the call center can then more timely, adequately and effectively dispatch any adequate type of emergency services, personnel or tools that may be useful or relied on at the emergency site to assist the user.

FIG. 1 illustrates an example wireless communication system 100. The wireless communication system 100 may include base stations 110A, 110B (also referred to as "wireless communication nodes 110" or "stations 110") and user equipments (UEs) 120AA . . . 120AN, 120BA . . . 120BN (also referred to as "wireless communication devices 120" or "terminal devices 120"). The wireless communication link may be a cellular communication link conforming to 3G, 4G, 5G, 6G or other cellular communication protocols. In one example, the wireless communication link supports, employs or is based on an orthogonal frequency division multiple access (OFDMA). In one aspect, the UEs 120AA . . . 120AN are located within a geographical boundary with respect to the base station 110A, and may communicate with or through the base station 110A. Similarly, the UEs 120BA . . . 120BN are located within a geographical boundary with respect to the base station 110B, and may communicate with or through the base station 110B. A network between UEs 120 and the base stations 110 may be referred to as radio access network (RAN). In some embodiments, the wireless communication system 100 includes more, fewer, or different number of base stations 110 than shown in FIG. 1.

In some embodiments, the UE 120 may be a user device such as a mobile phone, a smart phone, a personal digital assistant (PDA), tablet, laptop computer, wearable computing device (e.g., head mounted display, smart watch), etc. Each UE 120 may communicate with the base station 110 through a corresponding communication link. For example, the UE 120 may transmit data to a base station 110 through a wireless communication link (e.g., 3G, 4G, 5G, 6G or other cellular communication link), and/or receive data from the base station 110 through the wireless communication link (e.g., 3G, 4G, 5G, 6G or other cellular communication link). Example data may include audio data, image data, text, etc. Communication or transmission of data by the UE 120 to the base station 110 may be referred to as an uplink communication. Communication or reception of data by the UE 120 from the base station 110 may be referred to as a downlink communication.

In some embodiments, the base station 110 may be an evolved node B (eNB), a gNodeB, a femto station, or a pico station. The base station 110 may be communicatively coupled to another base station 110 or other communication devices through a wireless communication link and/or a wired communication link. The base station 110 may receive data (or a RF signal) in an uplink communication from a UE 120. Additionally or alternatively, the base station 110 may provide data to another UE 120, another base station, or another communication device. Hence, the base station 110 allows communication among UEs 120 associated with the base station 110, or other UEs associated with different base stations.

In some embodiments, the wireless communication system 100 includes a core network 170. The core network 170 may be a component or an aggregation of multiple components that ensures reliable and secure connectivity to the network for UEs 120. The core network 170 may be communicatively coupled to one or more base stations 110A, 110B through a communication link. A communication link between the core network 170 and a base station 110 may be a wireless communication link (e.g., 3G, 4G, 5G, 6G or other cellular communication link) or a wired communication link (e.g., Ethernet, optical communication link, etc.). In some embodiments, the core network 170 includes user plane function (UPF), access and mobility management function (AMF), policy control function (PCF), etc. The UPF may perform packet routing and forwarding, packet inspection, quality of service (QoS) handling, and provide external protocol data unit (PDU) session for interconnecting data network (DN). The AMF may perform registration management, reachability management, connection management, etc. The PCF may help operators (or operating devices) to easily create and seamlessly deploy policies in a wireless network. The core network 170 may include additional components for managing or controlling operations of the wireless network. In one aspect, the core network 170 may receive a message to perform a network congestion control, and perform the requested network congestion control. For example, the core network 170 may receive explicit congestion notification (ECN) from a base station 110 and/or a UE 120, and perform a network congestion control according to the ECN. For example, the core network 170 may adjust or control an amount of data generated, in response to the ECN. Additionally or alternatively, the core network 170 may adjust or control an amount of data transmitted and/or received, in response to the ECN.

In some embodiments, the wireless communication system 100 includes an application server 160. The application server 160 may be a component or a device that generates, manages, or provides content data. The application server 160 may be communicatively coupled to one or more base stations 110A, 110B through a communication link. A communication link between an application server 160 and a base station 110 may be a wireless communication link (e.g., 3G, 4G, 5G, 6G or other cellular communication link) or a wired communication link (e.g., Ethernet, optical communication link, etc.). In one aspect, an application server 160 may receive a request for data from a UE 120 through a base station 110, and provide the requested data to the UE 120 through the base station 110. In one aspect, an application server 160 may receive a message to perform a network congestion control, and perform the requested network congestion control. For example, the application server 160 may receive explicit congestion notification (ECN) from a base station 110, a UE 120, or a core network 170, and perform a network congestion control according to the ECN. For example, the application server 160 may adjust or control an amount of data generated, in response to the ECN. Additionally or alternatively, the application server 160 may adjust or control an amount of data transmitted and/or received, in response to the ECN. Additionally or alternatively, the application server 160 may adaptively adjust or control an error correct rate. An error correction rate may be a rate of a number of error correction packets (also referred to as "protection packets") per a set of packets for transmission. An error correction packet can be provided to help recover content. The application server 160 may adaptively adjust the error correction rate, according to a signal quality of a signal received by a UE 120 or a location of the UE 120 with respect to one or more base stations 110.

In some embodiments, communication among the base stations 110, the UEs 120, application server 160, and the core network 170 is based on one or more layers of Open Systems Interconnection (OSI) model. The OSI model may include layers including: a physical layer, a Medium Access Control (MAC) layer, a Radio Link Control (RLC) layer, a Packet Data Convergence Protocol (PDCP) layer, a Radio Resource Control (RRC) layer, a Non Access Stratum (NAS) layer or an Internet Protocol (IP) layer, and other layer.

Figure 2:
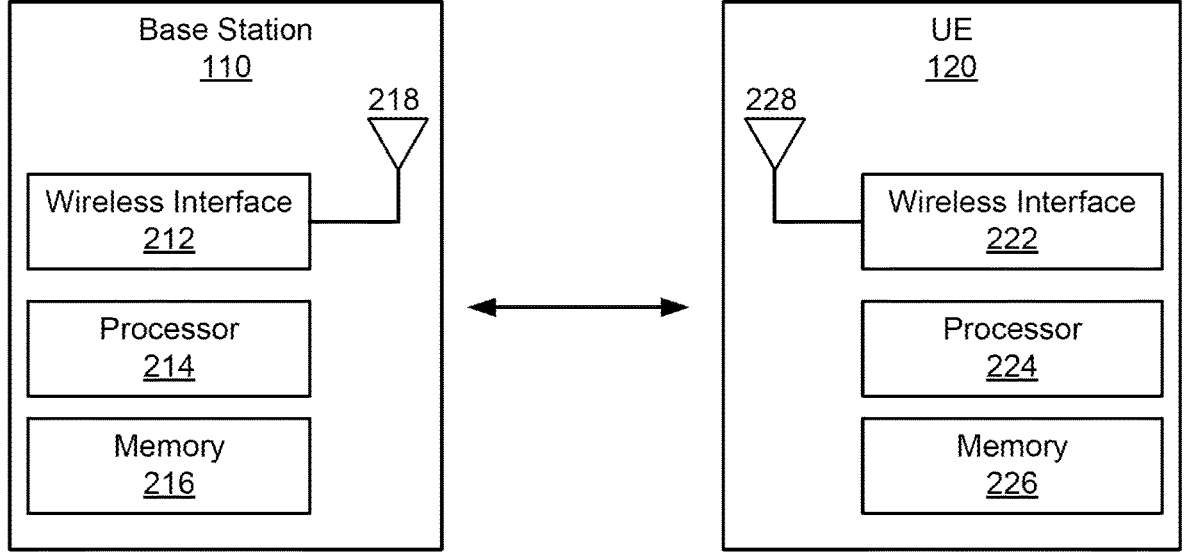
FIG. 2 is a diagram showing example components of a base station and a user equipment, according to an example implementation of the present disclosure.

FIG. 2 is a diagram showing example components of a base station 110 and a user equipment 120, according to an example implementation of the present disclosure. In some embodiments, the UE 120 includes a wireless interface 222, a processor 224, a memory device 226, and one or more antennas 228. These components may be embodied as hardware, software, firmware, or a combination thereof. In some embodiments, the UE 120 includes more, fewer, or different components than shown in FIG. 2. For example, the UE 120 may include an electronic display and/or an input device. For example, the UE 120 may include additional antennas 228 and wireless interfaces 222 than shown in FIG. 2.

The antenna 228 may be a component that receives a radio frequency (RF) signal and/or transmits a RF signal through a wireless medium. The RF signal may be at a frequency between 200 MHz to 100 GHz. The RF signal may have packets, symbols, or frames corresponding to data for communication. The antenna 228 may be a dipole antenna, a patch antenna, a ring antenna, or any suitable antenna for wireless communication. In one aspect, a single antenna 228 is utilized for both transmitting a RF signal and receiving a RF signal. In one aspect, different antennas 228 are utilized for transmitting the RF signal and receiving the RF signal. In one aspect, multiple antennas 228 are utilized to support multiple-in, multiple-out (MIMO) communication.

The wireless interface 222 includes or is embodied as a transceiver for transmitting and receiving RF signals through one or more antennas 228. The wireless interface 222 may communicate with a wireless interface 212 of the base station 110 through a wireless communication link. In one configuration, the wireless interface 222 is coupled to one or more antennas 228. In one aspect, the wireless interface 222 may receive the RF signal at the RF frequency received through an antenna 228, and downconvert the RF signal to a baseband frequency (e.g., 0~1 GHz). The wireless interface 222 may provide the downconverted signal to the processor 224. In one aspect, the wireless interface 222 may receive a baseband signal for transmission at a baseband frequency from the processor 224, and upconvert the baseband signal to generate a RF signal. The wireless interface 222 may transmit the RF signal through the antenna 228.

The processor 224 is a component that processes data. The processor 224 may be embodied as field programmable gate array (FPGA), application specific integrated circuit (ASIC), a logic circuit, etc. The processor 224 may obtain instructions from the memory device 226, and execute the instructions. In one aspect, the processor 224 may receive downconverted data at the baseband frequency from the wireless interface 222, and decode or process the downconverted data. For example, the processor 224 may generate audio data or image data according to the downconverted data, and present an audio indicated by the audio data and/or an image indicated by the image data to a user of the UE 120. In one aspect, the processor 224 may generate or obtain data for transmission at the baseband frequency, and encode or process the data. For example, the processor 224 may encode or process image data or audio data at the baseband frequency, and provide the encoded or processed data to the wireless interface 222 for transmission.

The memory device 226 is a component that stores data. The memory device 226 may be embodied as random access memory (RAM), flash memory, read only memory (ROM), erasable programmable read-only memory (EPROM), electrically erasable programmable read-only memory (EEPROM), registers, a hard disk, a removable disk, a CD-ROM, or any device capable of storing data. The memory device 226 may be embodied as a non-transitory computer readable medium storing instructions executable by the processor 224 to perform various functions of the UE 120 disclosed herein. In some embodiments, the memory device 226 and the processor 224 are integrated as a single component.

In some embodiments, the base station 110 includes a wireless interface 212, a processor 214, a memory device 216, and one or more antennas 218. These components may be embodied as hardware, software, firmware, or a combination thereof. In some embodiments, the base station 110 includes more, fewer, or different components than shown in FIG. 2. For example, the base station 110 may include an electronic display and/or an input device. For example, the base station 110 may include additional antennas 218 and wireless interfaces 212 than shown in FIG. 2.

The antenna 218 may be a component that receives a radio frequency (RF) signal and/or transmits a RF signal through a wireless medium. The antenna 218 may be a dipole antenna, a patch antenna, a ring antenna, or any suitable antenna for wireless communication. In one aspect, a single antenna 218 is utilized for both transmitting a RF signal and receiving a RF signal. In one aspect, different antennas 218 are utilized for transmitting the RF signal and receiving the RF signal. In one aspect, multiple antennas 218 are utilized to support multiple-in, multiple-out (MIMO) communication.

The wireless interface 212 includes or is embodied as a transceiver for transmitting and receiving RF signals through one or more antennas 218. The wireless interface 212 may communicate with a wireless interface 222 of the UE 120 through a wireless communication link. In one configuration, the wireless interface 212 is coupled to one or more antennas 218. In one aspect, the wireless interface 212 may receive the RF signal at the RF frequency received through antenna 218, and downconvert the RF signal to a baseband frequency (e.g., 0~1 GHz). The wireless interface 212 may provide the downconverted signal to the processor 214. In one aspect, the wireless interface 212 may receive a baseband signal for transmission at a baseband frequency from the processor 214, and upconvert the baseband signal to generate a RF signal. The wireless interface 212 may transmit the RF signal through the antenna 218.

The processor 214 is a component that processes data. The processor 214 may be embodied as FPGA, ASIC, a logic circuit, etc. The processor 214 may obtain instructions from the memory device 216, and execute the instructions. In one aspect, the processor 214 may receive downconverted data at the baseband frequency from the wireless interface 212, and decode or process the downconverted data. For example, the processor 214 may generate audio data or image data according to the downconverted data. In one aspect, the processor 214 may generate or obtain data for transmission at the baseband frequency, and encode or process the data. For example, the processor 214 may encode or process image data or audio data at the baseband frequency, and provide the encoded or processed data to the wireless interface 212 for transmission. In one aspect, the processor 214 may set, assign, schedule, or allocate communication resources for different UEs 120. For example, the processor 214 may set different modulation schemes, time slots, channels, frequency bands, etc. for UEs 120 to avoid interference. The processor 214 may generate data (or UL CGs) indicating configuration of communication resources, and provide the data (or UL CGs) to the wireless interface 212 for transmission to the UEs 120.

The memory device 216 is a component that stores data. The memory device 216 may be embodied as RAM, flash memory, ROM, EPROM, EEPROM, registers, a hard disk, a removable disk, a CD-ROM, or any device capable for storing data. The memory device 216 may be embodied as a non-transitory computer readable medium storing instructions executable by the processor 214 to perform various functions of the base station 110 disclosed herein. In some embodiments, the memory device 216 and the processor 214 are integrated as a single component.

Figure 3:
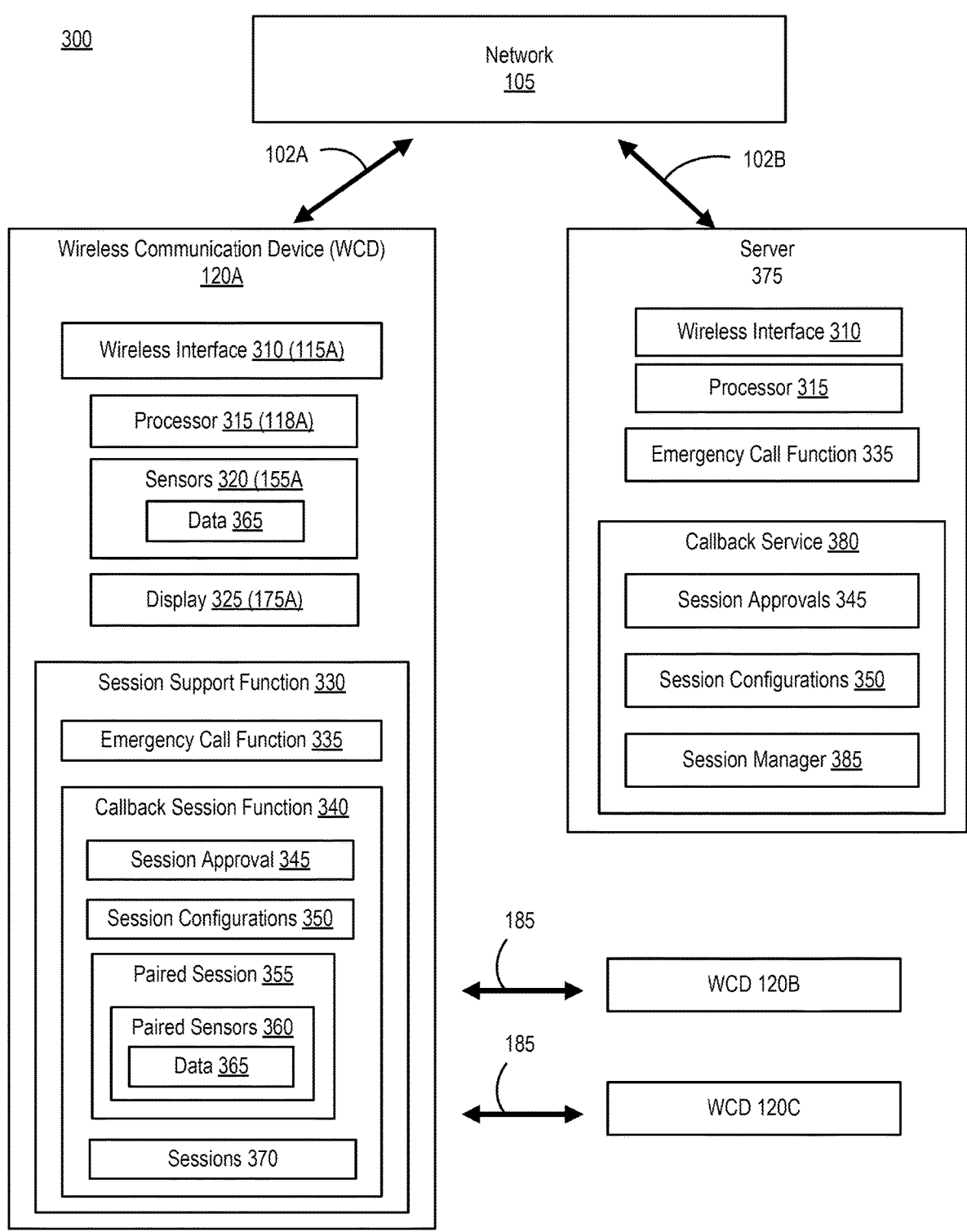
FIG. 3 is a block diagram of an example system for providing one or more callback sessions for transferring sensor data in emergency situations, according to an example implementation of the present disclosure.

FIG. 3 is a block diagram of an example system 300 for providing, by a remote server of an emergency call center, a callback/supplemental emergency session to grant access to sensor data of a user device and/or any devices paired with the user device to the remote server. In some embodiments, the example system 300 includes one or more wireless communication devices 120 (e.g., WCD 120A, WCD 120B, WCD 120C), which can also be referred to as UE 120 and which can communicate with one or more servers 375 via one or more networks 105 and one or more wireless links 102A and 102B. Each WCD 120 (e.g., UE 120) can include one or more wireless interfaces 310, processors 315, sensors 320 that can include data 365, displays 325 and/or session support functions 330. Each session support function 330 can include one or more emergency call functions 335 and one or more callback session functions 340, which can include one or more session approvals 345, session configurations 350 and paired sessions 355 that can include paired sensors 360 and their corresponding data 365. Session support function 330 can support one or more sessions 370 for callback emergency. Across the network 105, each server 375 can include one or more wireless interfaces 310, processors 315, emergency call functions 335 and callback services 380 that can include one or more sessions approvals 345, session configurations 350 and session managers 385. Different WCDs 120 (e.g., WCDs 120A-C) can communicate and can share data between each other via sessions 370 using wireless links 185. The server 375 of the emergency call center can access the data 365 of the sensors 320 of the WCD 120 corresponding to the initial emergency call via the callback or additional/replacement session(s) 370 along with any data 365 from sensors 360 of any WCDs 120 paired or connected to the WCD 120 with which the server 375 has established the session(s) 370.

In one example, system 300 can include a server 375 corresponding to an emergency call center, such as the PSAP. The server 375 or the call center can receive emergency calls (e.g., via emergency call functions 335) and can provide or dispatch first responders to the emergency sites. The server 375 can receive an emergency call, message or otherwise a communication from a user via an emergency call function 335 on the WCD 120A. In response to the received communication, the server 375 can utilize the processors 315 and wireless interfaces 310, to activate a callback service 380 of the server 375. Using the callback service 380 and the session support function 330 on the user's WCD 120A, the server 375 can access any data 365 generated by any sensors 320 (e.g., cameras, microphones, health data sensors on smartwatches, sensors on vehicles or any other devices connected or paired with the WCD 120A). The server 375 can access any data 365 from any paired sensors 360 of the WCD 120 devices via one or more sessions supported by WCD 120A or sessions supported by the paired WCDs 120 (e.g., WCD 120B-C). A session manager 385 of the callback service 380 can establish and/or manage the sessions 370 via the callback session function 340 on the WCD 120A in accordance with session configurations 350 and in response to session approval 345. Using the sensor data 365 from the sensors 320, 360 via the callback sessions 370, the callback service 380 can gather, collect and/or process any incoming information indicative or corresponding to the emergency situation in which the user may be. Using the data 365, the server 375 can allow the emergency call center to more accurately assess severity of the emergency and can provide appropriate emergency response.

Wireless communication devices 120 (also referred to as WCDs 120 or UEs 120) can communicate with servers 375 via any number of wireless links, such as 102A, 102B or 185. Wireless links 102 or 185 can include any wireless communication, including any wireless connections or sessions utilizing any wireless communication protocols between two devices. For example, wireless links 102 or 185 can include cellular communication, Wi-Fi communication, Bluetooth communication, near-field wireless communication links or any other wireless communication instances between different computing devices. Wireless links 102 can connect to one or more networks 105, which can include any functionality of a network 170 and via which WCDs 120 and servers 375 can communicate.

A WCD 120 can include any combination of hardware and software for receiving, processing, generating and/or wirelessly communicating data or information. WCD 120 can include a UE 120 and any functionality of a UE 120. For example, a WCD 120 can include a smartphone, a tablet or a personal computer, a wearable device, such as a smart watch, smart glasses or a heads up display. WCD 120 can include any computing or a communication system of a vehicle, such as an automobile, a helicopter or an airplane, or any device capable of communicating wireless data.

A WCDs 120 can include any processors 315 and wireless interfaces 310 for data processing and network communication. Processors can include, for example, processors 214 or 224 and any functionality of processors 214 or 224. Wireless interfaces 310 can include any interfaces for communicating wirelessly, such as interfaces for cellular communication (e.g., 3G, 4G, 5G), Wi-Fi wireless communication, Bluetooth communication, near-IR radio communication or any other wireless communication.

Sensors 320, as well as paired sensors 360, can include any sensors or devices for sensing/acquiring/gathering data or measurements. Sensors 320 or 360 can include one or more photographic cameras or video cameras, infrared cameras, thermal imaging cameras, microphones, temperature sensors, proximity sensors, humidity sensors, smoke sensors, pressure sensors, navigation sensors, such as the global positioning system (GPS) sensors, vibration sensors, airflow sensors, velocity sensors or accelerometers. Sensors 320 or 360 can include weather related sensors, or any sensors or devices for gathering weather or surrounding environment data. Sensor 320 or 360 can include one or more health sensors or vital signs sensors, such as smartwatch or smartphone sensors measuring oxygen level in blood, a heartbeat rate or pulses, respiratory rate, body temperature. Sensors 320 or 360 can generate data 365 which can include any measurements or readings from any type and form of a sensor, such as a video and audio live stream or a recording, measurements from temperature, pressure or a heat sensor or data from any data or a reading from any sensor 320 or 360.

Display 325 can include any display or a screen of a WCD 120. Display can include a touch screen of a WCD 120. Display 325 can include a user interface or an input function to allow a user to input responses to prompts or requests. Display 325 can include an LCD or an OLED screen. Display 325 can include the functionality for a user to provide a session approval 345 for the WCD 120 to establish and support thereon a session with the server 375 via a session support function 330. Along with a display 325, WCD 120 can include any other output device, such as a speaker.

Session support function 330 can include any combination of hardware and software for supporting, sustaining or providing a session 370. Session support function 330 can include any functionality for establishing, supporting or sustaining a connection with a callback service 380 of a server 375. Session support function 330 can include computer code, instructions or functionality for establishing, maintaining, sustaining or providing a session or a connection with a server 375 via wireless interface 310. Session support function 330 can be activated by a remote server 375 (e.g., callback service 380 or a session manager 385 of the server 375). Session support function 330 can be activated in response to a pre-approval, such as a prior implemented session approval 345, or a session approval 345 achieved via a smartphone communication with a user on a WCD 120A.

Emergency call function 335 can include any function on the WCD 120 or server 375 for making or receiving emergency calls. Emergency call function 335 can include a voice call functionality for making a 911 voice call to an emergency call center or a server 375. Emergency call function 335 can include a text message or a web-based functionality for accessing the server 375. Emergency call functions 335 on the WCD 120 and a server 375 can maintain an emergency communication between a user and an emergency call center. Emergency call function 335 can include a functionality for providing information or data to a server 375 to identify the WCD 120 in the event of a dropped emergency call.

Session support function 330 can sustain, maintain or provide a session 370 on the WCD 120 in response to a session approval 345. Session approval 345 can be an approval provided by a user of the WCD 120 to allow the remote server 375 to establish a session 370 on or via the WCD 120 in response to a detected emergency event. For example, the server 375 can detect an emergency event in response to receiving a call from the WCD 120. The call can be an emergency call to an emergency call center, such as a 911 call. Session support function 330 can, in response to identifying a session approval 345, provide access to the callback service 380 of the server 375 to allow formation of the session 370 by the server 375 on the WCD 120.

Session approval 345 can include data or instructions corresponding to approval to form or maintain a session 370 on the WCD 120, in the event of an emergency. Session approval 345 can include data, instructions, commands or settings to form and sustain a session 370 between server 375 and WCD 120 to provide sensor data 365 from sensors 320 or 360 to the callback service 380 on the server 375 when an emergency is detected. The emergency can be detected according to a phone call via an emergency call function 335 from a WCD 120A to an emergency call center, such as a server 375.

Session approval 345 can include a pre-approval that is stored on the WCD 120 or the server 375 prior to the emergency event, or an approval that is gained from the user of the WCD 120 during the emergency call. For example, session approval 345 can provide or activate a user interface on the display 325 of the WCD 120, or via a voice call or an emergency call function 335, to allow the user to provide the approval for the remote server 375. The approval can include the approval for the server 375 to use the callback service 380 to establish the session 370 on the WCD 120 and access data from sensors 320 or paired sensors 360 (e.g., from the paired WCDs 120). Session approval 345 can provide a functionality for the user to provide the approval via a voice response, a press of a button, a verbal response, a touch of the touch screen of the display 325, and/or a movement of a portion of a body as captured by a sensor 320 (e.g., camera or a proximity sensor), including a movement of the head, eyes, or a hand gesture for instance. Session approval 345 can include a pre-approval that was implemented or established at the time of the purchase or initial configuration of the WCD 120.

Session configuration 350 can include any settings or configurations for a session 370, such as an augmented session, between the server 375 and the WCD 120. Session configuration 350 can include settings, instructions or configurations for configuring the WCD 120 to support, maintain, establish and/or provide the session with or for the server 375. Session configuration 350 can include data on sensors 320 on the WCD 120 and settings, configurations or instructions for server 375 to access the sensors 320 via the WCD 120. Session configuration 350 can include data on sensors 360 on the remote WCDs 120 that are paired with the WCD 120 with which the server 375 establishes the session, along with any settings, configurations or instructions for server 375 to access the sensors 360 on the remote WCDs 120 via the intermediary WCD 120.

Session configuration 350 can include access configurations with WCDs 120 that are paired or otherwise connected to the WCD 120. For example, session configuration 350 can include instructions, commands or settings for providing data 365 from sensors 320 of the WCD 120A via a session 370 between the WCD 120A and a server 375. For example, session configuration 350 can include instructions, commands or settings for providing data 365 from sensors 360 of the WCDs 120B-C that are paired with the WCD 120A to provide data 365 to the server 375. Data 365 from sensors 360 of the paired WCDs 120 can be sent via the WCD 120A with whom server 375 maintains a session 370 or via other sessions 370 or connections from such WCDs 120 to the server 375.

Session configuration 350 can include session initiation protocol (SIP) instructions, settings or configurations. Session configuration 350 can include SIP massages having payload that can include messages corresponding to session description protocol (SDP). SIP messages can include offers/requests and answers/responses to form, maintain and/or provide session 370. SIP messages can include settings for connections or sessions for any number of sensors 320 or 360. Session configuration 350 can include predetermined SIP messages to ensure that sessions 370 are established automatically in response to the initiation from the server 375. For example, session configuration 350 can include SIP messages (e.g., responses and settings) which can be provided by the WCD 120A in response to the server 375 sending a request to establish the session 370. Server 375 can send a request or offer to establish a session 370 and can provide an identifier or a code uniquely identifying or corresponding to the server 375 or the callback service 380. In response to the identifier or the code, the session support function 330 can grant the session 370 offered by the server 375. SIP messages with the payload for establishing the session 370 (e.g., via SDP or other protocols) can be stored in the session configurations 350 and provided in response to one or more offers or requests from the server 375 to establish the session 370.

Session 370, sometimes also referred to as the callback session 370, can include any interactive exchange of information between two or more devices over a communication network. Session 370 can include a voice call session, an application data session, a streaming session, a session for exchange of data 365 from sensors 320 or 360 or any other session 370 between a WCD 120 and a server 375. Session 370 can include a time frame and protocol for communication exchange according to which information or data is exchanged. Session 370 can include an augmented session in which a user's voice connection is supplemented with sensor data 365 from sensors 320 and/or paired sensors 360 from the paired WCDs 120 with which the WCD 120 connected with the server 375 is paired. Session 370 can include a server-side session, a client-side session, a web session or a hypertext transfer protocol (HTTP) session. Session 370 can include a session for communication via a framework for organizing communication protocols, such as an internet protocol suite, including for example transmission control protocol (TCP), internet protocol (IP), user datagram protocol (UDP), or any other communication framework or protocols. Session 370 can include a two-way link in the TCP/IP protocol layer or any other protocol layer. Session 370 can include a communication via a session initiation protocol (SIP), such as, for example, including an internet phone call.

Server 375 can include any one or more servers, network communication devices or cloud-based services for providing callback service sessions 370 to WCDs 120. Server 375 can include a server, a server farm, a data center, a cloud-based service or a function or any other arrangement of logic and data that can be configured for providing callback service 380. Server 375 can include any combination of hardware and software for establishing and executing sessions, via WCDs 120, to gain access to data 365 from sensors 320 and 360. Server 375 can include wireless interfaces 310 and processors 315. Server 375 can include an emergency call function 335 for managing received emergency calls and callback service 380 functions for establishing sessions 370 with WCDs 120.

Callback service 380 of the server 375 can include any combination of hardware and software for establishing and maintaining a session 370 with WCD 120 for receiving data 365. Callback service 380 can include the functionality for processing received sensor data 365 and displaying data 365 on a display 325, which can be included in the server 375 or services in communication with the server 375. Callback service 380 can utilize the session with a WCD 120 to gain access to sensors 320 and paired sensors 360 via the WCD 120. Callback service 380 can include the functionality to initiate the session 370 and establish the session 370 based on the session approval 345. Session approvals 345 can be identified on the server 375. For example, a callback service 380 can identify session approvals 345 for a specific WCD 120 and based on the identified session approval 345 and session configurations 350, generate, initiate or otherwise establish a callback session with the specific WCD 120.

Session manager 385 can include any combination of hardware and software for managing the callback sessions 370 with the WCD 120. Session manager 385 can establish the sessions in response to identified session approvals 345. Session manager 385 can configure or setup the sessions based on the session configurations 350. Session manager 385 can access paired sessions 355 on the WCD 120 and can identify paired sensors 360 to configure and connect to the paired sensors 360 and access the data 365 of the paired sensors 360. Session manager 385 can manage and control the callback session function 340 on the WCD 120.

In some aspects, the present solution relates to a wireless communication device (WCD) 120A, such as a UE 120. The WCD 120A can include at least one processor (e.g., processor 315A). Processor 315A can be executed and configured using instructions, commands, executables or computer code that can be stored in memory of the WCD 120A, such as memory 226. Processor 315A can be configured to initiate a first communication session 370 with a server 375. The first communication session 370 can correspond to an emergency event and include any interactive exchange of information between the WCD 120A and a server 375. The first communication session 370 can include a communication, such as a voice call or a text that can be provided via a session established over a voice over IP. The session can be for communication between an emergency call function 335 of a server 375 and an emergency call function 335 of the WCD 120. Processor 315A can be configured to grant a second communication session 370 between the wireless communication device 120 and the server 375. The second communication session 370 can be configured or granted using session configurations 350. The second communication session 370 can be setup or configured to carry data from a sensor 320 or a paired sensor 360 to the server 375. The second communication session 370 can include any interactive exchange of information between the WCD 120 and a server 375, including an exchange of information between a callback service function 380 of a server 375 and a session support function 330 on the WCD 120. The session support function 330 of the WCD 120A can provide data 365 from the sensor 320 or paired sensor 360 (e.g., a camera, a microphone or a vital signs sensors) via the second session 370. The sensor 320 or 360 can be a sensor that did not or does not provide data for the first communication session (e.g., a sensor that was not utilized during the first communication session initiated by the user on the WCD 120). Processor 315A can be configured to provide, to the server 375, access to the data 365 from the sensor 320 or 360 via the second communication session 370.

The present solution can include a wireless communication device 120 in which the processor 315A is configured to initiate the first communication session 370 via a connection between the wireless communication device 120 and the server 375. Processor 315A can provide to the server 375, the access to the data 365 via the connection. The wireless communication device 120 can include the processor that is configured to identify a second wireless communication device 120B comprising a second sensor 360. The second sensor 360 can be accessible to the wireless communication device 120A. For example, the second sensor 360 can grant a third communication session 370 between the wireless communication device 120A and the server 375 to carry second data 365 from the second sensor 360. Processor 315A can be configured to provide, to the server 375, access to the second data 365 from the second sensor 360 via the third communication session 370. The third communication session 370 can include a session between a paired sensor 360 on a second WCD 120B that is paired with the WCD 120A that is connected to the server 375. The third communication session 370 can be established between the paired WCD 120 of the paired sensor 360 and the server 375 via a direct connection between the WCD 120 and the server 375.

Processor 315A can be configured to initiate the first communication session 370 via a first connection between the wireless communication device 120A and the server 375. Processor 315A can be configured to grant a second connection between the wireless communication device 120A and the server 375. The second connection can be initiated by the server 375 in response to the first connection being unavailable. The first connection can include a voice call or a voice over IP connection which was dropped or failed. Processor 315A can provide, to the server 375, the access to the data 365 via the second communication session 370 over the second connection. The second communication session 370 can include a callback session 370 established by a callback service 380 in response to the first connection being dropped.

The sensor 320 or 360 can include at least one of: a camera, a microphone, a temperature sensor, a light sensor, a position sensor, a motion sensor or a sensor measuring a vital sign of a user. The sensor 320 or 360 can reside with a second wireless communication device 120B. The second wireless communication device 120B can be in communication with the wireless communication device 120A which supports, sustains or provides the callback session 370 with the server 375. The second wireless communication device 120B can be a device that is paired with the first wireless communication device 120A, such as a smart watch, a vehicle communication device, a smartphone or a tablet.

The granting of the second communication session on the wireless communication device 120A can be is in response to a user input at the wireless communication device 120A. The granting of the second communication session 370 can be is in response to a setting (e.g., session configuration 350 or a session approval 345) that can be configured prior to the emergency event. Processor 315A can be configured to receive a connection request for the second communication session 370 in response to a trigger related to the first communication session 370.

In some aspects, the present solution relates to a non-transitory computer readable medium storing program instructions. The instructions can cause a processor 315A of a wireless communication device 120A to initiate a first communication session 370 with a server 375. The first communication session 370 can correspond to an emergency event. The instructions can cause the processor 315A to grant a second communication session 370 between the wireless communication device 120A and the server 375. The second communication session 370 can carry data 365 from a sensor 320 or 360. The sensor 320 or 360 can be accessible by the wireless communication device 120A. The sensor 320 or 360 can be not providing data 365 for the first communication session 370. The second communication session 370 can be granted in response to the authorization provided by the wireless communication device 120A. Processor 315A can provide, to the server 375, access to the data 365 from the sensor 320 or 360 via the second communication session 370. The sensor 360 can reside with a second wireless communication device 120B. The second wireless communication device 120B can be in communication with the wireless communication device 120A. For example, the second wireless communication device 120B can be paired with the wireless communication device 120A.

Figure 4:
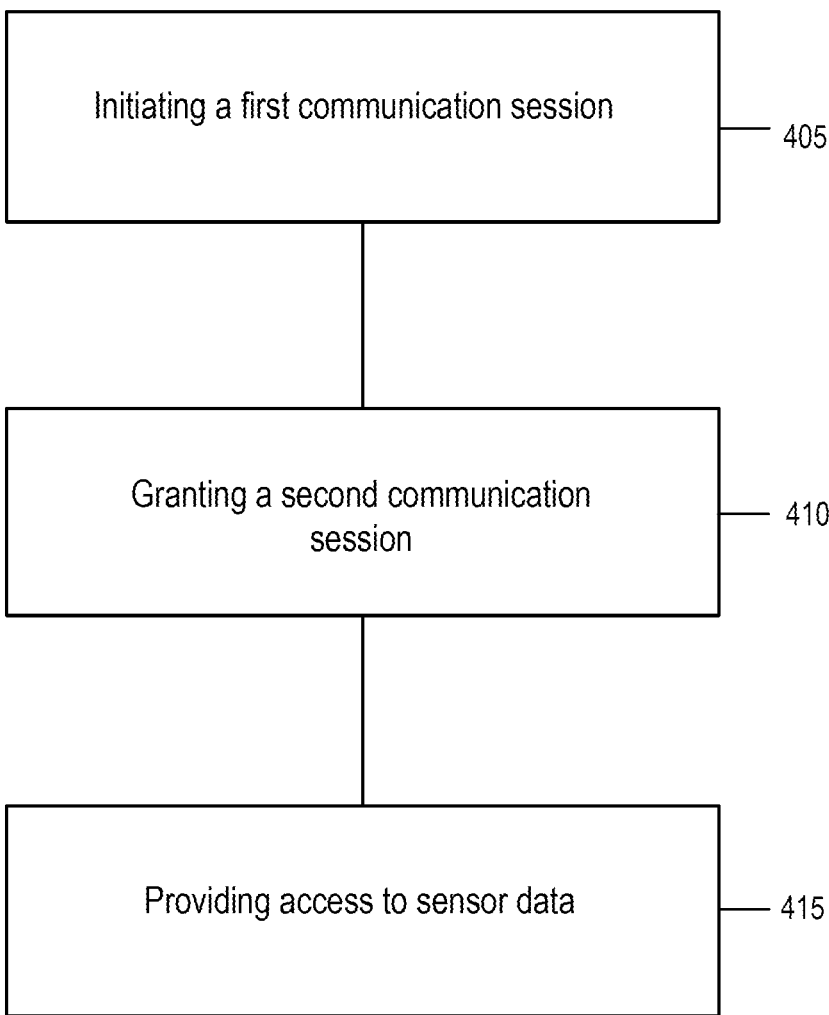
FIG. 4 is a flow diagram showing a process of providing one or more callback sessions for transferring sensor data, according to an example implementation of the present disclosure.

FIG. 4 illustrates an example flowchart of a method 400 for providing a callback/emergency session to provide to a remote server, data from sensors of a user's device in an emergency situation. Method 400 can include ACTS 405-415. The method 400 can be performed, for example, by one or more components of the system 300 illustrated and discussed in connection with FIG. 3. At ACT 405, the method initiates a first communication session. At ACT 410, the method grants a second communication session. At ACT 415, the method provides access to sensor data.

At ACT 405, the method initiates a first communication session. A wireless communication device (e.g., a user's smartphone, smartwatch, or a vehicle) can initiate a first communication session with a server. The first communication can be initiated in response to an emergency event, such as a vehicular accident or a health event. The emergency event can include any situation in which a user can seek a first responder service, including service of an ambulance, firefighters or police. The first communication session can include, be established using or be established in response to a voice call, a text communication or a message (e.g., a text message over a phone). The first communication can include a 911 call. The first communication can include a voice over IP call. The first communication can be directed to a server of the emergency service provider (e.g., PSAP). The first communication can be directed to a call center of the emergency call center and can be intercepted by a server corresponding to or associated with the emergency call center.

The wireless communication device can initiate the first communication session via a connection between the wireless communication device and the server. The connection can include a VoIP connection, a TCP/IP connection, an HTML connection, a connection over a cellular network, a connection over a Wi-Fi network, or a connection over a Bluetooth network. The wireless communication device of the user can initiate the connection with the server. The wireless communication device can include or have access to any number of sensors, such as photo or video cameras, microphones, or temperature, pressure, vibration, velocity or acceleration sensors, or user health sensors, such as vital signs sensors (e.g., sensors measuring heart rate, oxygen levels in the blood, blood pressure, body activity or any other human body related activity or data).

The wireless communication device can identify a second wireless communication device comprising a second sensor. The second sensor can be accessible to the wireless communication device. The second sensor can include any type and form of sensor as on the wireless communication device of the user. The user's wireless communication device can have access to the second sensor via a Bluetooth connection, a Wi-Fi connection or any local area network connection.

The wireless communication device of the user can identify one or more wireless communication devices that are paired with the wireless communication device. For example, the wireless communication device (e.g., smartphone) of the user can identify a smartwatch of the user or the vehicle of the user paired with user's wireless communication device. Paired devices can be identified by the callback session function on the user's wireless communication device. The user's wireless communication device can identify the second wireless communication device using paired session data or information, session configurations or session approvals.

The wireless communication device can initiate the first communication session via a first connection between the wireless communication device and the server. The wireless communication device can receive a connection request for the second communication session in response to a trigger related to the first communication session.

At ACT 410, the method grants a second communication session. The wireless communication device can grant a second communication session between the wireless communication device and the server to carry data from a sensor. The sensor can be a sensor on the user's wireless communication device or a sensor on a wireless communication device paired with the user's wireless communication device. Data provided to the server via the session can include a live video or audio feed, a stream of measurements or data points or any readings from any sensor. The data can include, for example a video and/or audio stream from the user's smartphone camera or a health related data, such as readings of the user's heart rate measurements, blood pressure measurements, blood oxygen levels, user body activity rate or any other data related to the user. The sensor can be accessible by the wireless communication device. The sensor may not provide data for the first communication session. The sensor may provide data for the second communication session.

The wireless communication device can grant a third communication session between the wireless communication device and the server to carry second data from the second sensor. The wireless communication device can grant a second connection between the wireless communication device and the server. The second connection can be initiated by the server in response to the first connection being unavailable. For example, a first connection (e.g., initial 911 call from the user's wireless communication device) can be dropped and the server can initiate a second connection with the user's wireless communication device in response to the first connection being dropped. The granting of the second communication session can be in response to user input at the wireless communication device. The user's input can include a pre-configuration or a pre-approval to initiate a callback session which the user had provided prior to the emergency event. The user's input can include a user's approval of the callback session in response to the server's request to establish a callback session. The user's approval can include a user's press of a button, verbal or voice response or a user's nod or gesture movement. The granting of the second communication session can be in response to a setting configured prior to the emergency event. For example, the callback configuration on the user's wireless communication device can include session configurations allowing for the server to access sensors and paired devices via the user's wireless communication device and the callback service of the server can establish the session in response to the identified session configurations.

At ACT 415, the method provides access to sensor data. The session support function of the wireless communication device can provide to the server (e.g., callback service of the server) access to the data from the sensor via the second communication session. The wireless communication device can provide to the server the access to the data via the connection established between the user's wireless communication device and the server. The wireless communication device can provide to the server access to the second data from the second sensor via the third communication session, such as a communication session between the wireless communication device paired with the user's wireless communication device and the server.

The wireless communication device can provide to the server the access to the data via the second communication session over the second connection. The second connection can include the connection established by the server with the user's wireless communication device in response to the first connection failing, being terminated or dropped. The second wireless communication device can be in communication with the wireless communication device. The second wireless communication device can be paired with the wireless communication device. The user's wireless communication device can provide data from the second wireless communication device via a connection between the user's wireless communication device and the server and via the connection between the user's wireless communication device and the paired wireless communication device. The user's wireless communication device can access the data from the second sensor on the paired wireless communication device and forward the accessed data to the server.

Figure 5:
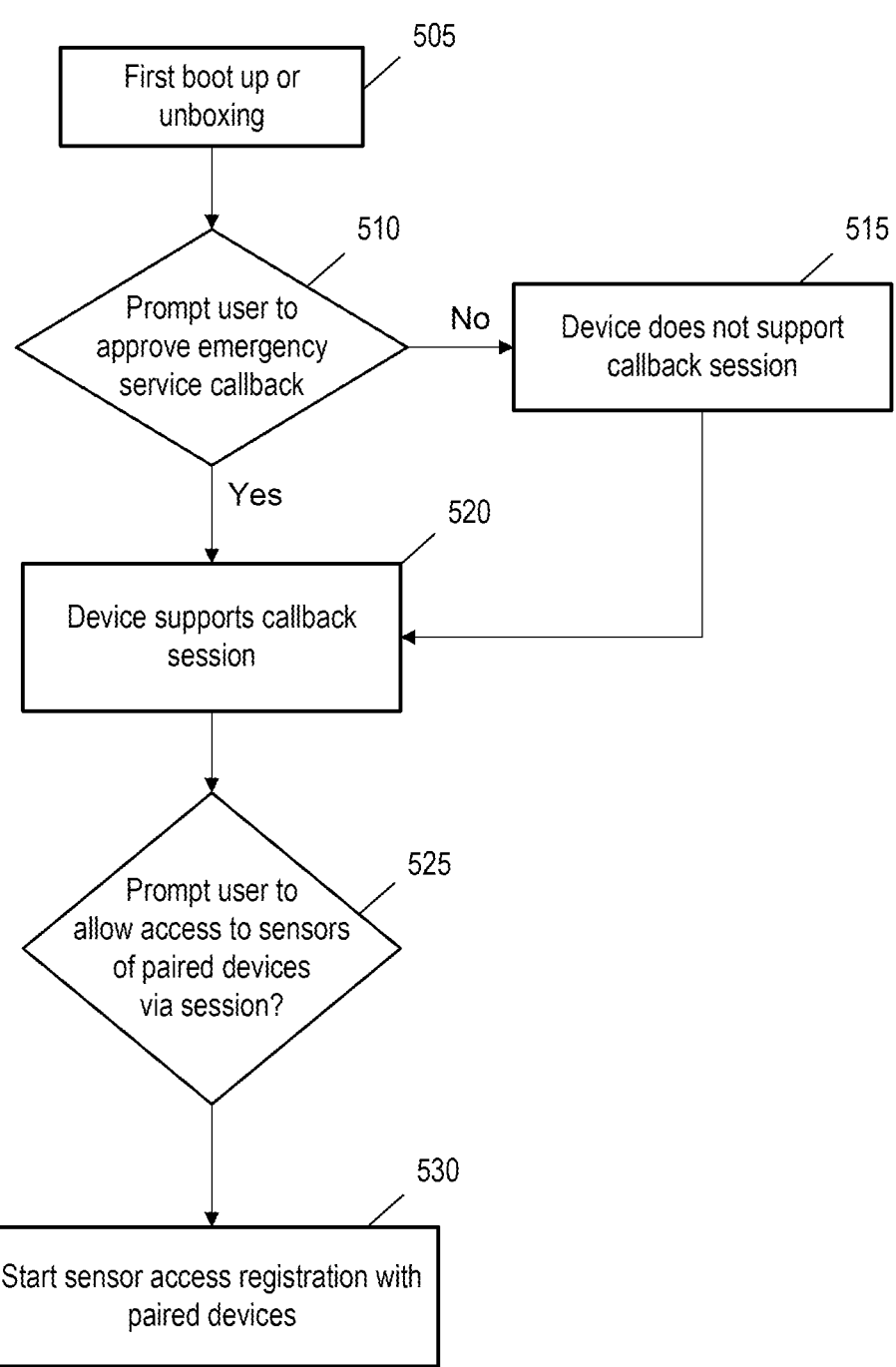
FIG. 5 is an interaction diagram showing a process of configuration of a user device with callback session functionality (e.g., upon an initial boot up of the user device), according to an example implementation of the present disclosure.

FIG. 5 illustrates an example flowchart of a method 500 for setting up or configuring wireless communication devices providing a callback/emergency session, e.g., to provide to a remote server data from sensors of a user's device in an emergency situation. Method 500 can include ACTS 505-530. The method 500 can be performed, for example, by one or more components of the system 300 illustrated and discussed in connection with FIG. 3. At ACT 505, the method performs device initialization, such as a first boot up or unboxing. At ACT 510, the method prompts the user to approve the emergency service callback. At ACT 515, if the user rejects the request for approval, the method determines that the device does not support callback session. At ACT 520, if the user approves the request for approval, the method determines that the device supports the callback session. At ACT 525, the method prompts the user to allow access to sensors of paired devices via the callback session. At ACT 530, the method starts sensor access registration with paired devices.

At ACT 505, the method performs system initialization, e.g., a first boot up or unboxing. The boot up can include the initial power up of a wireless communication device. For example, a wireless communication device can trigger an initial configuration function or initial boot up function to allow the user to configure or set up the device. The wireless communication device can trigger a session support function to prompt the user to provide an approval (e.g., pre-approval) for establishing sessions with the callback service of the remote server in response to emergency situations.

At ACT 510, the method prompts the user to approve the emergency service callback. For example, a wireless communication device can include a session configuration function to configure the callback sessions during the initial boot up or initial setup of the device. The session support function can boot up and can provide a prompt to the user for session approval or pre-approval. The user can utilize the display to provide an approval (e.g., pre-approval) for establishing sessions by a remote server in response to emergency calls by the user from the device (e.g., via emergency call functions).

At ACT 515, if the user rejects the request for approval, the method determines that the device does not support callback session. In the event that the user declines the option for the sessions 370 to be established in response to emergency events, the device can choose not to implement the configurations for allowing the server to establish callback sessions. The WCD can also leave the option for the user to provide an approval in the future, such as in response to occurrence of an emergency. For example, even after the initial decline for approving callback sessions, in response to an emergency call from the WCD the user may be prompted to provide an approval for the remote server to establish a callback session with the WCD.

At ACT 520, if the user approves the request for approval, the method determines that the device supports the callback session. For example, the user can provide a pre-approval for establishment of callback sessions during the initial boot up or initial powering of the WCD. In response to the pre-approval, the WCD can establish configurations or settings for accessing the sensors on devices that are paired with the WCD.

At ACT 525, the method prompts the user to allow access to sensors of paired devices via the callback session. The WCD can provide a user interface on a display to prompt the user to allow access to sensors of the paired devices. The WCD can generate an approval for accessing the sensors of the paired devices in response to verbal or visual response from the user, such as an affirmative reply via a phone, a textual response or a gesture.

At ACT 530, the method starts sensor access registration with paired devices. Sensors of the paired devices can be identified via the WCD and the user can select the sensors and/or the paired devices to include in the configuration. Sensor access registration can include selection of the sensors and/or devices by the user, via a user interface, which the WCD can receive. In response to the received user inputs, the session configuration can setup and/or store settings or configurations for accessing the sensors (e.g., cameras, microphones, vital signs sensors or other sensors or detectors) of the paired devices (e.g., paired smart watches or other wearable devices, smart phones, tablets, computers or vehicles).

Figure 6:
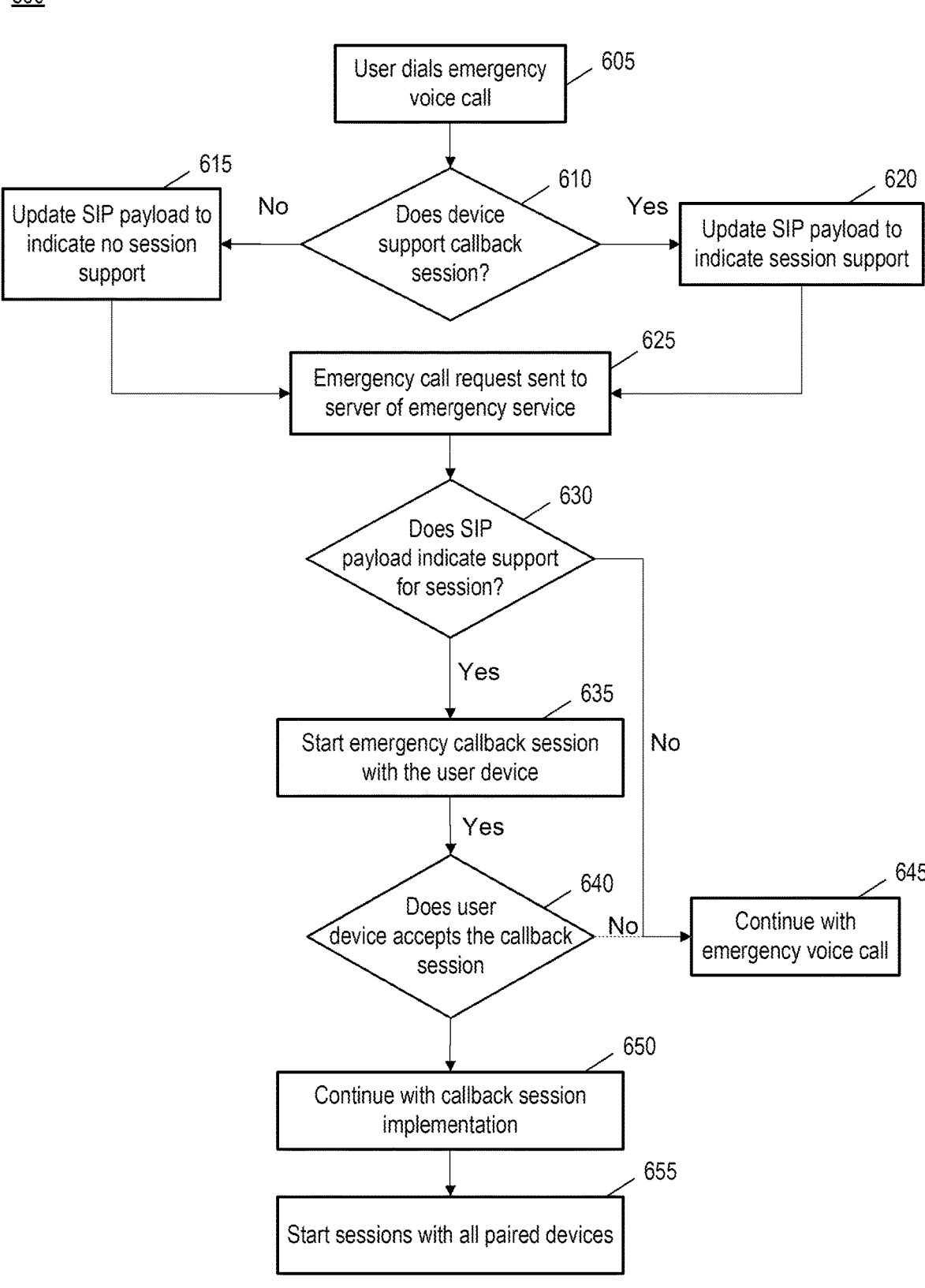
FIG. 6 shows an interaction diagram showing a process of implementing a callback session between a server and a user device, according to an example implementation of the present disclosure.

FIG. 6 illustrates an example flowchart of a method 600 for establishing a callback session with a server to provide sensor data from a user device and devices paired with the user device. Method 600 can include ACTS 605-655. The method 600 can be performed, for example, by one or more components of the system 300 illustrated and discussed in connection with FIG. 3. At ACT 605, the method receives a call from a user dialing an emergency voice call. At ACT 610, the method determines if the device supports the callback session. At ACT 615, if the device does not support the callback session, the method updates the SIP payload to indicate no session supported. At ACT 620, if the device supports the callback session, the method updates SIP payload to indicate session support. At ACT 625, the method sends the call request to prompt the user to allow access to sensors of paired devices via the callback session. At ACT 630, the method determines if the SIP payload indicates support for the session. At ACT 635, the method starts emergency callback session with the user device. At ACT 640, the method determines if the user accepts the callback session. At ACT 645, the method can continue with the emergency voice call. At ACT 650, the method can continue with the callback session implementation. At ACT 655, the method can start sessions with all paired devices.

At ACT 605, the method receives a call from a user dialing or initiating an emergency voice call. The user can initiate a first session, such as a voice call, text message or any communication to an emergency service. For example, a user can initiate a call by dialing a 911 on a smartphone. The server can count this call as a first session with the user device (e.g., WCD). The server can receive a SIP payload corresponding to a first session between the user device and the server (e.g., initial emergency phone call).

At ACT 610, the method determines if the device supports the callback session. The server can access session configurations to identify if the WCD corresponding to the first session (e.g., emergency call) supports the callback session. For example, information or data identifying the WCD can be stored on the server, on a database or in a list of devices that support the callback session. The server can check a SIP payload corresponding to session configurations, a copy of which can be stored on the user device or on the server, to determine if the callback session is enabled, allowed, approved or supported by the user device (e.g., WCD).

At ACT 615, if the device does not support the callback session, the method updates the SIP payload to indicate no session supported. In the event that the server determines that the user device does not support the callback session, the user device can update the SIP payload to indicate that the callback session is not supported by the user device.

At ACT 620, if the device supports the callback session, the method updates SIP payload to indicate session support. In the event that the device does support the callback session, the server or the WCD can update the SIP payload to indicate session support. For example, in response to determining that the user device is one of the devices supporting the callback session, the server or the WCD can update SIP payload to indicate that the WCD supports callback session and that the session can be established by the server.

At ACT 625, the method sends the emergency call request to prompt the user to allow access to sensors of paired devices via the callback session. For example, in response to the emergency call request (e.g., first session) from a user device (e.g., in the event of an emergency), the emergency service can forward the call request to the server. The server can receive the emergency call request regardless of whether or not the user's device is configured or approved to support the callback session.

At ACT 630, the method determines if the SIP payload indicates support for the session. The server can determine, based on the contents of the SIP payload, whether the user device supports the session. The server can determine that the user device (e.g., WCD) supports the callback session in response to the SIP payload including instructions, settings or indications for establishing the session. For example, the SIP payload can include session approval or session configurations. The SIP payload can include information on paired sensors or data from paired sensors.

At ACT 635, the method starts an emergency callback session with the user device. The server can initiate the callback session with the user device. The server can utilize SIP payload information to send a request for establishing the session to the user device. The server can establish the session to access the data generated by the sensors of the user device. For example, the server can establish the session with the user device to access a live feed from a camera or a microphone of the user device or a vital sign sensor from the user device. If the payload does not indicate support for a session with the user device, the server can move on to ACT 645 to continue with the emergency voice call, not proceeding with establishing the session.

At ACT 640, the method determines if the user accepts the callback session. For example, the server can send to the user device a request for the user to accept the callback session. The user may choose to accept or reject the callback session. If the user rejects the callback session, the server can move onto ACT 645 continuing with the voice call. If the user chooses to accept the callback session, the server can move on to ACT 650 to continue with callback session implementation.

At ACT 645, the method can continue with the emergency voice call. In the event that the callback session is not approved or the user does not accept the callback session, the server can continue maintaining the voice call with the user. In this scenario, the user may not establish the callback session, or may delay establishing the callback session, continuing to communicate with the server (e.g., callback center) via the voice connection or session.

At ACT 650, the method can continue with the callback session implementation. The server can proceed with establishing the session with the user device using session configurations on the user device. For example, the callback service of the server can communicate with session support function and can utilize any session approvals or session configurations to establish and implement the session between the server and the user device. The server can establish the session so that the session is granted by the user device according to session approvals and session configurations. The server can configure one or more sessions so that the data from sensors of the user device are provided via the one or more sessions.

At ACT 655, the method can start sessions with all paired devices. The server can initiate, establish or implement sessions with any paired devices to access the sensor data from the devices paired with the user device. For example, the server can establish, via the user device, sessions with one or more paired devices to which the user device is connected (e.g., via Bluetooth, Wi-Fi or any other connection). For example the server can establish sessions with one or more devices paired with the user device through the user device or independently from the user device. For example, the server can establish sessions with paired devices via the connection with the user device or via connections between the paired devices and the server. The server can access any sensor data from any sensors of the paired devices per configurations or settings for the paired devices on the user device and per any approval by the user device.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
initiating, by a wireless communication device, a first communication session with a server, the first communication session corresponding to an emergency event;
identifying, by the wireless communication device, a second wireless communication device comprising a sensor, wherein the sensor is accessible to the wireless communication device;
granting, by the wireless communication device, a second communication session between the wireless communication device and the server to carry data from the sensor, wherein the sensor is not providing data for the first communication session; and
providing, by the wireless communication device to the server, access to the data from the sensor via the second communication session.

2. The method of claim 1, comprising:
initiating, by the wireless communication device, the first communication session via a connection between the wireless communication device and the server, the connection of the first communication session configured via a first configuration to support voice data and not support the data from the sensor; and
providing, by the wireless communication device to the server, the access to the voice data via the connection.

3. The method of claim 1, comprising:
identifying, by the wireless communication device, a second sensor of the wireless communication device, wherein the second sensor is accessible to the wireless communication device;
granting, by the wireless communication device, a third communication session between the wireless communication device and the server to carry second data from the second sensor; and
providing, by the wireless communication device to the server, access to the second data from the second sensor via the third communication session.

4. The method of claim 1, comprising:
initiating, by the wireless communication device, the first communication session via a first connection between the wireless communication device and the server;
granting, by the wireless communication device, a second connection between the wireless communication device and the server, the second connection initiated by the server in response to the first connection being unavailable;
providing, by the wireless communication device to the server, the access to the data via the second communication session over the second connection.

5. The method of claim 1, wherein the sensor includes at least one of: a camera, a microphone, a temperature sensor, a light sensor, a position sensor, a motion sensor, or a sensor measuring a vital sign of a user.

6. The method of claim 5, wherein the sensor resides with a second wireless communication device, the second wireless communication device in communication with the wireless communication device.

7. The method of claim 1, wherein the granting of the second communication session is in response to user input at the wireless communication device.

8. The method of claim 1, wherein the granting of the second communication session is in response to a setting configured prior to the emergency event.

9. The method of claim 1, comprising:
receiving, by the wireless communication device, a connection request for the second communication session in response to a trigger related to the first communication session.

10. A wireless communication device comprising at least one processor configured to:
initiate a first communication session with a server corresponding to an emergency event;
identify a second wireless communication device comprising a sensor, wherein the sensor is accessible to the wireless communication device;
grant a second communication session between the wireless communication device and the server to carry data from the sensor, wherein the sensor is not providing data for the first communication session; and
provide, to the server, access to the data from the sensor via the second communication session.

11. The wireless communication device of claim 10, wherein the at least one processor is configured to:
initiate the first communication session via a connection between the wireless communication device and the server, the connection of the first communication session configured via a first configuration to support voice data and not support the data from the sensor; and
provide to the server, the access to the voice data via the connection.

12. The wireless communication device of claim 10, wherein the at least one processor is configured to:
identify a second sensor of the wireless communication device, wherein the second sensor is accessible to the wireless communication device;
grant a third communication session between the wireless communication device and the server to carry second data from the second sensor; and
provide, to the server, access to the second data from the second sensor via the third communication session.

13. The wireless communication device of claim 10, wherein the at least one processor is configured to:
initiate the first communication session via a first connection between the wireless communication device and the server;
grant a second connection between the wireless communication device and the server, the second connection initiated by the server in response to the first connection being unavailable;
provide, to the server, the access to the data via the second communication session over the second connection.

14. The wireless communication device of claim 10, wherein the sensor includes at least one of: a camera, a microphone, a temperature sensor, a light sensor, a position sensor, a motion sensor or a sensor measuring a vital sign of a user.

15. The wireless communication device of claim 14, wherein the sensor resides with a second wireless communication device, the second wireless communication device in communication with the wireless communication device.

16. The wireless communication device of claim 10, wherein the granting of the second communication session is in response to a user input at the wireless communication device.

17. The wireless communication device of claim 10, wherein the granting of the second communication session is in response to a setting configured prior to the emergency event.

18. The wireless communication device of claim 10, wherein the at least one processor is configured to:

receive a connection request for the second communication session in response to a trigger related to the first communication session.

19. A non-transitory computer readable medium storing program instructions for causing at least one processor of a wireless communication device to:

initiate a first communication session with a server corresponding to an emergency event;

identify a second wireless communication device comprising a sensor, wherein the sensor is accessible to the wireless communication device;

grant a second communication session between the wireless communication device and the server to carry data from the sensor, wherein the sensor is not providing data for the first communication session, and the second communication session is granted in response to authorization provided by the wireless communication device; and provide, to the server, access to the data from the sensor via the second communication session.

20. The non-transitory computer readable medium of claim 19, wherein the instructions are configured to:

identify a second sensor of the wireless communication device, wherein the second sensor is accessible to the wireless communication device;

grant a third communication session between the wireless communication device and the server to carry second data from the second sensor; and provide, to the server, access to the second data from the second sensor via the third communication session.

* * * * *